United States Patent [19]

Hamamoto et al.

[11] Patent Number: 4,627,201
[45] Date of Patent: Dec. 9, 1986

[54] WINDOW STAY

[75] Inventors: Atsushi Hamamoto, Hyogo; Yoshio Kawaoto, Gifu, both of Japan

[73] Assignees: Kawasaki Jukogyo Kabushiki Kaisha; Alna Koki Co., Ltd., both of Hyogo, Japan

[21] Appl. No.: 634,363

[22] Filed: Jul. 25, 1984

[30] Foreign Application Priority Data

Jul. 27, 1983 [JP] Japan .................................. 58-138584

[51] Int. Cl.⁴ .............................................. E06B 3/00
[52] U.S. Cl. ........................................ 52/208; 52/397; 52/400; 296/84 A; 296/84 D
[58] Field of Search .................. 52/208, 397, 400, 398, 52/171, 172; 296/84 A, 84 D, 84 R

[56] References Cited

U.S. PATENT DOCUMENTS

| 1,872,309 | 8/1932 | Loebel | 52/400 |
| 2,576,392 | 11/1951 | Downes | 52/208 |
| 3,196,998 | 7/1965 | Owen | 52/397 |
| 3,254,461 | 6/1966 | White et al. | 52/397 |
| 3,344,573 | 10/1967 | Martin et al. | 52/400 |
| 3,955,331 | 5/1976 | Williams | 52/397 |
| 4,295,309 | 10/1981 | Garman | 52/208 |
| 4,349,993 | 9/1982 | Tanaka et al. | 52/208 |

FOREIGN PATENT DOCUMENTS

| 1237287 | 3/1967 | Fed. Rep. of Germany | 52/208 |
| 1273783 | 7/1968 | Fed. Rep. of Germany | 52/208 |
| 1902702 | 9/1970 | Fed. Rep. of Germany | 52/400 |
| 2263990 | 7/1973 | Fed. Rep. of Germany | 52/397 |
| 2752235 | 6/1978 | Fed. Rep. of Germany | 52/398 |
| 584105 | 1/1947 | United Kingdom | 52/400 |

Primary Examiner—John E. Murtagh
Assistant Examiner—Caroline Dennison
Attorney, Agent, or Firm—Koda and Androlia

[57] ABSTRACT

A window stay for the support of a window glass for use in vehicles, with a window frame and a glass retainer firmly secured to the window frame with the peripheral edge portion of the window glass sandwiched fluid-tight between the window frame and the glass retainer. An elastic cushioning strip encircles the peripheral edge portion of the window glass and is held in position between the window frame and the glass retainer during assembly of the peripheral edge portion of the window glass in the sandwich. To avoid relative displacement of the glass retainer, a rim projection is integrally formed with the window frame, thereby permitting the glass retainer to resist the reactive force exerted by the compressed elastic cushioning strip.

4 Claims, 9 Drawing Figures

WINDOW STAY

BACKGROUND OF THE INVENTION

1. Field of the Invention

The present invention generally relates to a window stay and, more particularly, to a framework for the support of a panel member such as a glass plate to make up window.

2. Prior Art

Windows, particularly those used in vehicles such as trains, automobiles or the like, have stringent requirements for fluid tightness to avoid possible intrusion of rain and/or dust; resistance to vibration; resistance to shock due to impingement of solids on the glass plate; and safety. In view of this, window stays generally employed nowadays comprise a metallic window frame which is secured to the wall structure and an elastic cushioning strip encircling the peripheral edge of the glass plate and held in position between the window frame and the glass retainer to avoid direct contact between the glass plate and either the window frame or the glass retainer. The elastic cushioning strip is either a strip made of elastic shock absorbing material or a strip made by drying or curing a filler-sealant which has been applied during the fabrication of the window. The compression of the strip sandwiched between the window frame and the glass retainer results in a reactive force tending to restore the strip to its original shape which provides both fluid tightness and vibration resistance.

One example of a prior art window stay so far found to be closest to the present invention is illustrated in FIG. 1 of the accompanying drawings.

FIG. 1 shows a cross-sectional representation of the prior art window stay taken in a direction generally perpendicular to the plane of the glass plate. The wall structure 1, for example, a double-paneled side wall of a train car, has a window frame 2 rigidly secured to it. An elastic cushioning strip 3 has a groove of a width generally equal to or slightly smaller than the thickness of the glass plate 4. The groove receives the glass plate 4. The elastic cushioning strip 3 is mounted in window frame 2 with its one side face held in contact with the peripheral flange 2a of window frame 2; and its other side in contact with the glass retainer 5 is secured to window frame 2 by means of a plurality of set screws 6 to press the peripheral edge of the glass plate 4 against the peripheral flange 2a. This prior art window stay is so designed that when the set screws 6 are tightened in the assembly described above, the elastic cushioning strip 3 is in a state of compression which exerts a reactive force tending to restore the elastic cushioning strip to its original shape. The effect of this reactive force is to tighten all contact seals permitting the window as a whole to exhibit fluid tightness, resistance to vibration and resistance to shock all at one time.

In the prior art window stay of the construction described above, the extent to which the elastic cushioning strip 3 is compressed depends on the extent to which the set screws 6 are tightened. Because of this, the set screws 6 used have to be of a type having a rigid and robust threaded shank; at the same time, the glass retainer 5 must have a relatively large cross-sectional area to withstand the reactive force. In addition, the set screws 6 must be placed at an angle relative to each other as shown in FIG. 1. Accordingly, a relatively large space is required for the mounting of the prior art window stay and the mounting procedures are complex.

These disadvantages and inconveniences in the prior art window stay exist because only the glass retainer 5 and the set screws 6 withstand the reactive force exerted by the compressed elastic cushioning strip 3. If one or more extra members were utilized in cooperation with the glass retainer 5 and the set screws 6 to withstand the reactive force, the above-described disadvantages and inconveniences would be obviated.

Furthermore, the prior art window stay under discussion makes use of the elastic cushioning strip 3 for the purpose of permitting the window stay as a whole to exhibit both the fluid tightness and shock absorbing properties. It has, however, been found that sole use of the elastic cushioning strip 3 is not effective in avoiding any possible separation from both the window frame 2 and the elastic cushioning strip 3 of fragments of the glass plate 4 when the latter has been cracked owing to, for example, collision with a stone. If fragments of the broken glass plate 4 separate, some train passengers seated adjacent to the window will be subjected to cuts and/or other accidents will occur. This dangerous possibility may be eliminated if the peripheral edge of the glass plate is bonded to the window frame 2 by the use of a bonding agent.

It is well known that vehicle front windows are generally subjected to a safety test during which they are struck by concrete blocks, one at a time. The requirements for passing this test include the provision that, even though the window glass cracks or is depressed, fragments of the broken window glass must not scatter into the interior of the vehicle. In anticipation of these safety requirements, it is not only necessary to improve the physical strength of each of the component parts of the glass window such as the glass plate and the window frame, but also to provide means for retaining the glass plate in the window frame and avoiding any separation between them. In other words, any relative movement between the glass plate and elastic cushioning strip must be substantially eliminated or minimized to keep the strip in tight contact with the peripheral edge of the glass plate. Then, even if the glass plate deforms as a result of being impacted by rigid foreign matter, the peripheral edge of the glass plate will stay in the window frame.

In spite of the foregoing consideration, the prior art window stay makes use of the elastic cushioning strip only for the purpose of providing fluid tightness and cushioning between the glass plate and the window frame, permitting relative slip between them to occur. Therefore, the prior art window stay has the disadvantages that the glass plate is insufficiently retained in the window frame and also in that the resistance to impact is low.

SUMMARY OF THE INVENTION

Accordingly, the present invention has been developed to substantially eliminate the above described disadvantages and inconveniences inherent in the prior art window stay. Its essential object is to provide an improved window stay wherein the transmission of the reactive force produced by the compressed elastic cushioning strip to the glass retainer, particularly to the set screws or bolts, is advantageously minimized.

Another important object of the present invention is to provide an improved window stay of the type referred to above, wherein for securing the glass retainer to the window frame set bolts with relatively small diameter shanks are used. These set bolts require less space and also improve the outer appearance of the window.

A further object of the present invention is to provide an improved window stay with fewer fitting and mounting procedures but of increased effectiveness.

A still further object of the present invention is to provide an improved window stay, wherein the glass retainer can be accurately positioned around the periphery of the panel member such as a glass plate while the reactive force exerted by the compressed elastic cushioning strip is transmitted substantially uniformly to impart high fluid tightness to the resulting window.

A still further object of the present invention is to provide an improved window stay wherein the glass retainer is designed to apply a compressive force uniformly to the elastic cushioning strip to allow the latter to exert a reactive force by which the glass plate can be firmly retained in position in the window frame.

A yet still further object of the present invention is to provide an improved window stay in which the glass plate can be firmly retained in position between the window frame and the glass retainer with no substantial possibility of any glass fragments being separated and scattered, and hence, a window which has a relatively high impact strength.

BRIEF DESCRIPTION OF THE DRAWINGS

These and other objects and features of the present invention will become readily understood upon reading the following detailed description in combination with the accompanying drawings, in which.

DETAILED DESCRIPTION OF THE INVENTION

Figure 1:
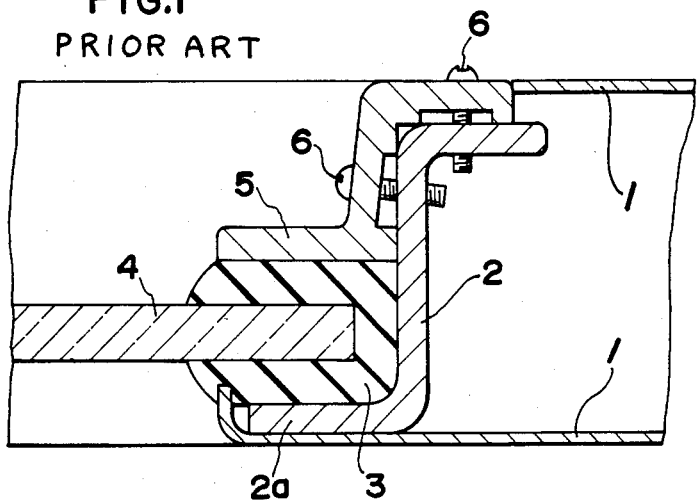
FIG. 1 is a cross-sectional view of the prior art window stay, reference to which has already been made under the heading of "BACKGROUND OF THE INVENTION"

Before describing the present invention, it is to be noted that like parts are designated by like reference numerals throughout the accompanying drawings.

Figure 2:
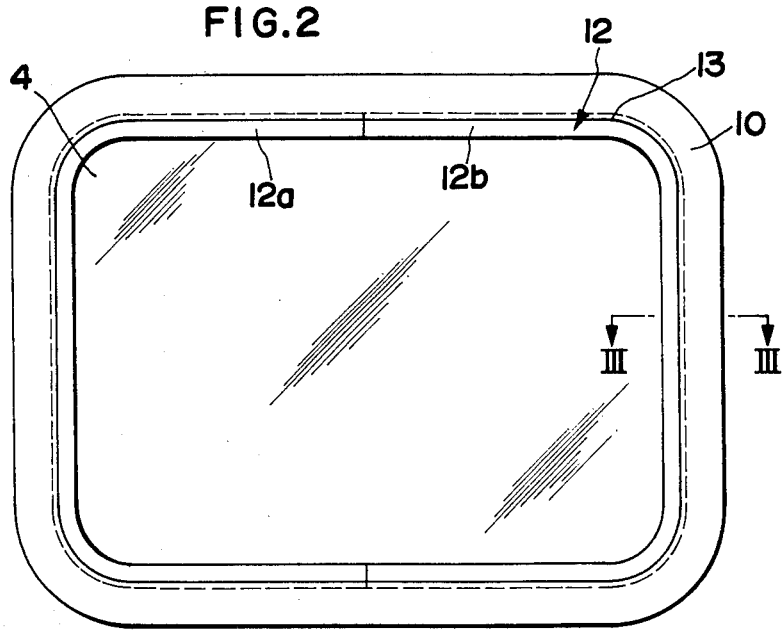
FIG. 2 is a front elevational view of window stay according to a first preferred embodiment of the present invention.
Figure 3:
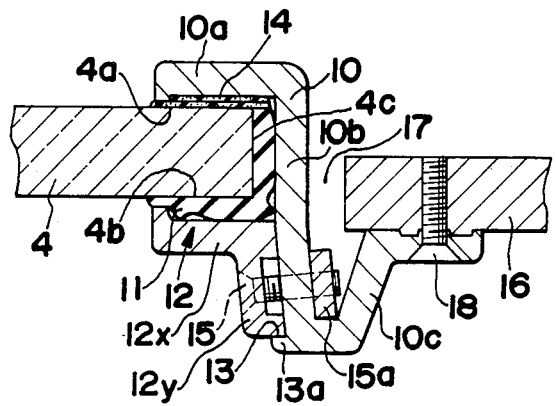
FIG. 3 is a view similar to FIG. 1, showing fragmentary cross-sectional representation of the window stay in an enlarged scale at the line III—III in FIG. 2.

Referring first to FIGS. 2 and 3, a window stay embodying the present invention is a unitary structure comprising a panel member, for example, a glass plate 4, having its peripheral edge portion supported against a window frame 10 by means of a glass retainer 12 connected to the window frame 10. This unitary window structure is mounted to a wall structure partially shown by 16 in Fig.3 which has a window defining opening 17 provided therein in a manner which will become clear from the subsequent description.

The glass plate 4 is generally rectangular in shape and, hence window frame 10, glass retainer 12 and window defining opening 17 in wall structure 16 are correspondingly rectangular, but the invention is not limited to this shape.

As best shown in FIG. 3, the window frame 10 generally comprises a web 10b of predetermined width greater than the thickness of the glass plate 4 used, an abutment flange 10a integral with and extending in one direction from one side edge of the web 10b generally at right angles thereto so as to lie parallel to glass plate 4, and a mounting flange 10c integral with and extending in the opposite direction from the opposite side edge of the web 10b which has a shape similar to the mathematical square root symbol. Adjacent to the joint between the opposite side edge of the web 10b and the mounting flange 10c, the window frame 10 is integrally formed with a rim 13a protruding a slight distance from window frame 10 in the same direction in which the abutment flange 10a extends so as to define a generally right-angled bank 13 between it and the web 10b. On the other hand, the glass retainer 12 is of generally L-shaped cross-section and comprises a clamping flange 12x and a flank 12y which are disposed to lie generally parallel to the abutment flange 10a and the web 10b of the window frame 10 when the glass retainer 12 is coupled to the window frame 10 to make up the unitary window structure in a manner to be described later.

The window stay according to the present invention makes use of a generally L-sectioned elastic cushioning strip 11 preferably made of rubber material in the form of a substantially endless loop with a circumference corresponding to the circumference of the glass plate 4.

To make up the unitary window structure, the inside surface of the abutment flange 10a of the window frame 10, which engages one peripheral surface area 4a of the glass plate 4, is covered, or otherwise bonded, to an elastic adhesive strip 14 having a cushioning property. After the adhesive strip 14 has been applied to the abutment flange 10a in the manner described above, the glass plate 4 is mounted in the window frame 10 with its peripheral surface area 4a kept in contact with the elastic adhesive strip 14. The elastic cushioning strip 11 is then mounted circumferentially around the glass plate 4 to permit it to contact and cover both the opposite peripheral surface area 4b of the glass plate 4 and the peripheral cut face 4c of the glass plate 4. Preferably, the elastic cushioning strip 11 is undersized so that when it is mounted circumferentially of the glass plate 4 in the manner as previously described, it can be slightly elongated and, hence, precompressed to avoid its separation from the glass plate 4 during the mounting procedure. Thereafter, the glass retainer 12 is fitted in the window frame 10 with its clamping flange 12x and flank 12y held in abutment with the elastic cushioning strip 11 and the web 10b, respectively. As the final step of the mounting procedure, a number of fastening bolts 15 are passed through the flank 12y and then through the web 10b and are fixed in position by associated nuts 15a positioned on one side of the web 10b opposite the glass retainer 12, thereby completing the unitary window structure.

The unitary window structure fabricated as described above is then mounted in the window defining opening 17 in the wall structure 16 with the mounting flange 10c firmly connected to the wall structure 16 by means of set screws or bolts 18 threaded through the mounting flange 10c into the wall structure 16. Alternatively, it may be possible to make up the unitary window structure by first securing the window frame 10 to the wall structure 16, then mounting the glass plate 4 in the window frame 10, and finally setting the glass retainer 12 in the manner described above.

It is to be noted that, when the glass retainer 12 is set in position on the window frame 10 as best shown in FIG. 3, both the elastic adhesive strip 14 and the elastic cushioning strip 11 are inwardly compressed to provide fluid tightness. This inward compression produces a reactive force as in the case of the elastic cushioning strip employed in the prior art window stay. This reactive force acts, in the instance of the present invention, on the glass retainer 12 to displace the latter in a direction away from the abutment flange 10a of the window frame 10. However, because of the provision of the rim 13a defining the right-angled bank 13 in which the free side edge of the flank 12y is seated, no actual displacement of the glass retaining member 12 takes place.

The elastic adhesive strip 14 applied to the abutment flange 10a of the window frame 10 is preferably made of a fabric strip having its opposite surfaces coated with rubber adhesive material. By way of example, a commercially available double-sided adhesive tape comprising a fabric substrate, such as manufactured and sold by Nitto Denko K. K. of Japan under the trade name "Nitto Double-sided Adhesive Tape #525", may be employed as the elastic adhesive strip 14 for the purpose of the present invention. In practice, it is preferred to use two overlapping layers of the double-sided adhesive tape for the elastic adhesive strip 14. In any event, it has been found that the above-mentioned commercially available double-sided adhesive tape is most suited from the stand points of cushioning effect and bonding power.

Figure 9:
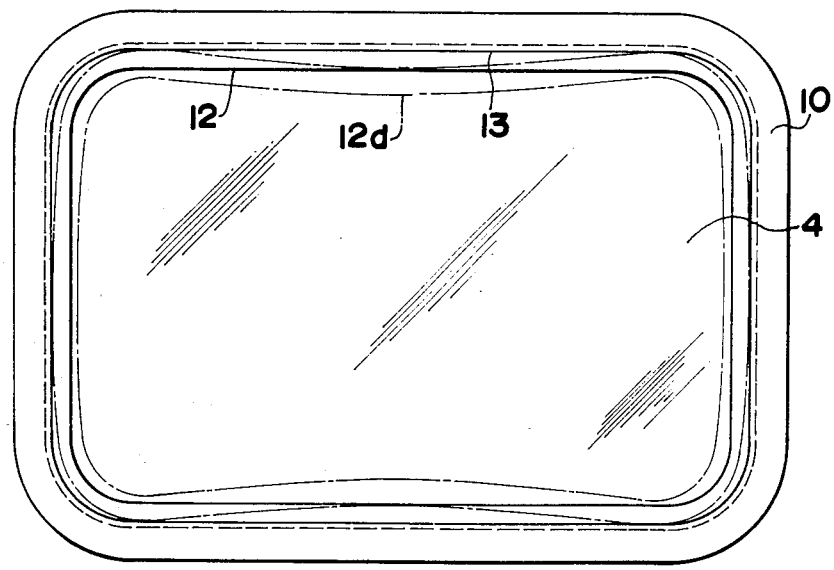
FIG. 9 is a view similar to FIG. 2, showing the window stay according to a fourth preferred embodiment of the present invention.

The glass retainer 12 shown in FIGS. 2 and 3 is made up of two split sections 12a and 12b of identical construction each being generally U-shaped in configuration. In other words, the glass retainer 12 employed in the embodiment shown in FIGS. 2 and 3 is of two-piece construction. However, it may be of one-piece construction, i.e., it may be employed in the form of a continuous rectangular glass retaining member as shown in FIG. 9. Where it is desired to employ a continuous glass retainer 12 as shown in FIG. 9, it is preferably slightly oversized so that, when secured firmly to the window frame 10 by means of the bolts and nuts 15 and 15a in the manner described above in connection with the embodiment of FIGS. 2 and 3, both the elastic adhesive strip 14 and the elastic cushioning strip 11 can be inwardly compressed to accommodate the difference in dimension between the slightly oversized glass retainer 12 and the circumference of rim 13a in the window frame 10.

In FIG. 9, the slightly oversized glass retainer 12 is somewhat exaggerated as shown by the chain lines. In any event, the glass retainer 12 according to the embodiment of FIG. 9 has the advantage that it can be set by a simple fitting procedure compared with that according to the embodiment of FIGS. 2 and 3.

Figure 4:
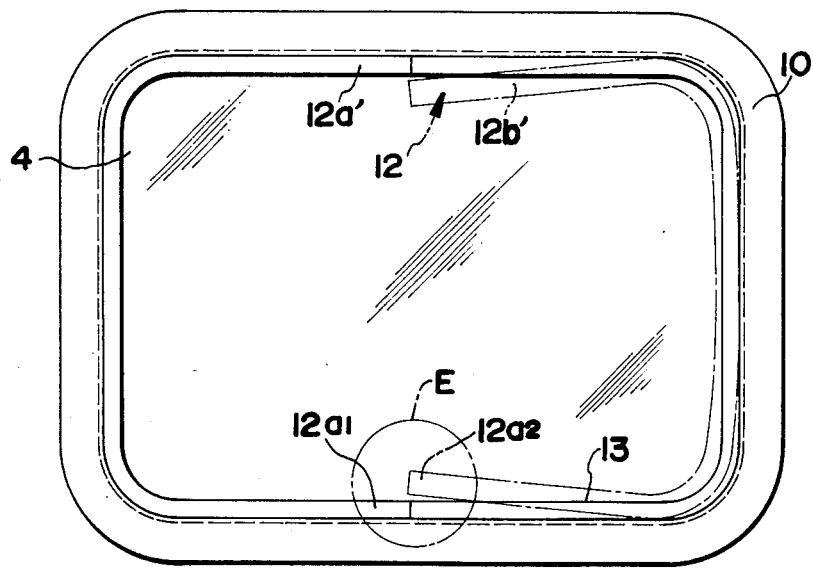
FIG. 4 is a view similar to FIG. 2, showing the manner in which a glass retainer is fitted.
Figure 5:
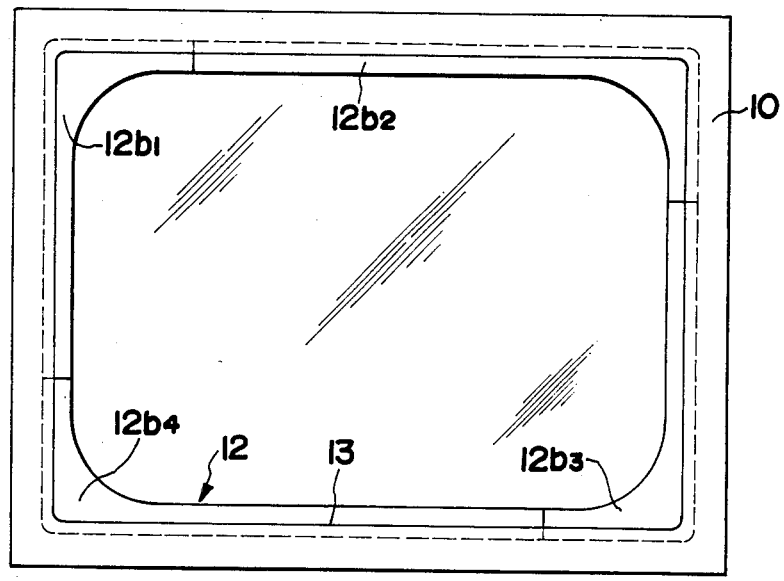
FIG. 5 is a view similar to FIG. 2, showing the window stay according to a second preferred embodiment of the present invention.
Figure 6:
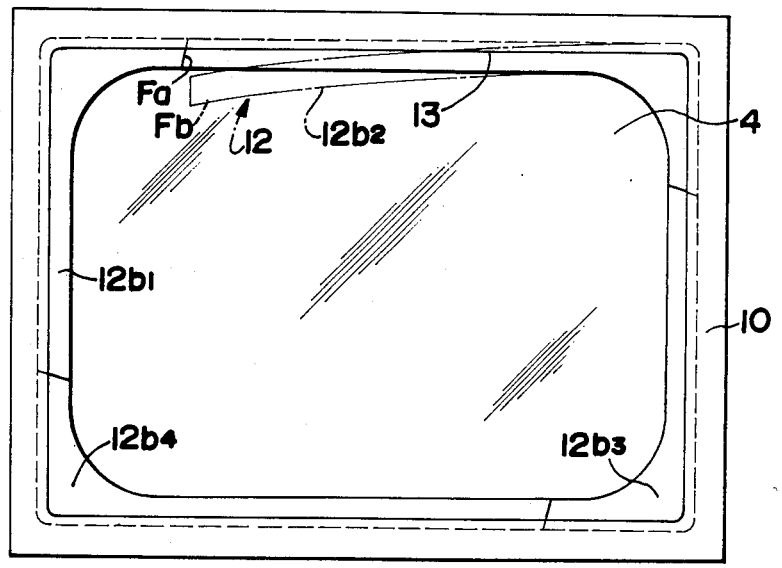
FIG. 6 is a view similar to FIG. 5, showing the manner in which a glass retainer is fitted in the window stay of FIG. 5.

Moreover, the glass retainer 12 used in the practice of the present invention is not always limited to either a one-piece or two-piece construction. The embodiment of FIG. 4 shows a two-piece construction (as does the embodiment of FIGS. 2 and 3) with the two split sections 12a' and 12b' sized so that the glass retainer 12 as a whole can be slightly oversized relative to the circumference of the rim 13a by, for example, a few millimeters when the circumference of rim 13a is 500 mm. In the example shown in FIG. 4, after one of the split sections 12a' or 12b', for example, the section 12a', has been secured to the window frame 10 by means of the bolts and nuts 15 and 15a and the other section 12b' has not yet been secured, but merely fitted to the window frame 10, at least one end of the other section 12b' will not be in end-to-end contact with the adjacent end of section 12a' as indicated by the chain-lined circle in FIG. 4. However, it can be brought into end-to-end abutment with the adjacent end of section 12a' when section 12b' and window frame 10 are fastened together by the bolts and nuts 15 and 15a with the elastic cushioning strip 11 consequently compressed inwardly, causing the glass plate 4 to be retained firmly to produce a fluid-tight window stay.

Where a relatively high rigidity is required in the glass retainer 12, a four-segment glass retainer may be employed as shown in FIGS. 5 and 6 where the glass retainer 12 comprises four segments 12b1, 12b2, 12b3, 12b4, all generally L-shaped and, when combined together, constituting a glass retainer 12 of generally rectangular configuration. In the embodiments of FIGS. 5 and 6 the four segments 12b1 through 12b4, each having a cross-section similar to that shown in FIG. 3, are preferably so sized that the glass retainer 12 as a whole can be oversized as described above in connection with any one of the embodiments of FIGS. 4 and 9.

It should be noted that the embodiment of FIGS. 5 and 6 differ from each other in that while the glass retainer 12 in the embodiment of FIG. 5 is split in a direction at right angles to the longitudinal axis of each side of the rectangular shape to provide the four segments 12b1 through 12b4, the glass retainer 12 in the embodiment of FIG. 6 is split in a direction diagonal to each side of the rectangular shape to provide the four segments 12b1 through 12b4.

Figure 7:
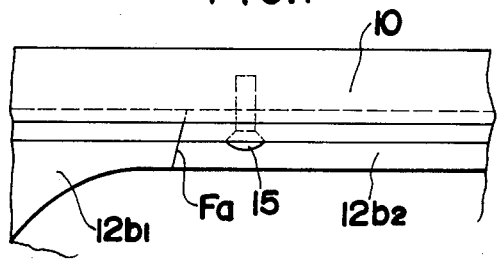
FIG. 7 is a fragmentary elevational view, on an enlarged scale, of a portion of the window stay shown in FIG. 6.

In particular, in the embodiment shown in Fig.6, when and after one of the segments, for example the segment 12b1, has been secured to window frame 10 by means of the bolts and nuts 15 and 15a, and when the next adjacent segment 12b2 is to be secured to the window frame 10 by means of bolts and nuts 15a and 15b, one inclined end face Fa of the segment 12b1 serves to guide the adjacent inclined end face Fb of the segment 12b2 to allow the latter to wedge into the correct position when one of the bolts 15 which is adjacent to the inclined end face Fb of the segment 12b2 is fastened by turning the associated nut 15a in the manner shown in Fig.7.

Figure 8:
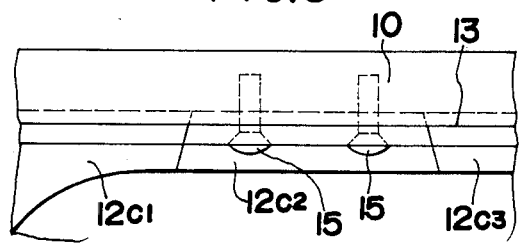
FIG. 8 is a view similar to FIG. 7, showing a portion of the window stay according to a third preferred embodiment of the present invention.

In the embodiment shown in FIG. 8, the glass retainer 12 is similar to that employed in the embodiment shown in and described with reference to FIGS. 5 and 6 in that it comprises the four segments. However, two of the four segments 12c1, 12c2, 12c3 and 12c4 (though the segment 12c4 is not illustrated in FIG. 8), that is, segments 12c1 and 12c3 which are to be positioned on the extreme sides of the window stay, are generally U-shaped while the remaining segments 12c2 and 12c4 are straight. In addition, each of the straight segments 12c2 and 12c4, which are to be positioned at the upper and lower extremities of the window stay, respectively, has its opposite ends inclined so as to converge at a point outside the window structure. Thus, after the side segments 12c1 and 12c3 have been secured to the window frame 10, the straight segments 12c2 and 12c4 are secured to frame 10 by being wedged between the opposite ends of the side segments 12c1 and 12c3, as shown, as the bolts 15 are fastened. Thus, when and after the straight segments 12c2 and 12c4 have been secured to the window frame 10 in the manner described above, the side segments 12c1 and 12c3 are biased in opposite directions away from each other to compress adjacent portions of the elastic cushioning strip 11 in contact with them.

While the individual preferred embodiments of the present invention have been described herein, it has been found that, when the window stay according to the embodiments shown in FIGS. 2 and 3 which is supporting a laminated glass plate which is made of a transparent reinforcement sheet, 0.5 mm in thickness, sandwiched tightly between a pair of glass plates, one 10 mm in thickness and the other 3mm in thickness, was tested by dropping a concrete block of 12.28 kg in weight onto the glass plate from a specific height so as to simulate a speed of 64.4 km/hr, the window stay met the previously described requirements without the glass fragments separating or scattering although the glass plate was depressed.

Although the present invention has been fully described in connection with the various preferred embodiments thereof with reference to the accompanying drawings, it is to be noted that numerous changes and modifications can be readily conceived by those skilled in the art upon reading of the disclosure herein without departing from the spirit and scope of the present invention. By way of example, although in describing each of the preferred embodiments of the present invention, the glass plate and the associated component parts of the window stay have been shown and described as having a generally rectangular shape, they may have any other shape, for example, a square shape, a circular shape or an oval shape.

Accordingly, unless they depart from the scope of the present invention as defined by the appended claims, they should be construed as included therein.

What is claimed is:

1. A window stay which comprises:
    a frame member having an abutment flange for contact with the peripheral edge portion of a panel member;
    a panel retaining member adapted to be secured firmly to the frame member in a manner with the peripheral edge portion of the panel member sandwiched tightly between it and the abutment flange;
    an elastic cushioning member encircling the peripheral edge portion of the panel member and sandwiched between the panel retaining member and the abutment flange together with the peripheral edge portion of the panel member, said elastic cushioning member so positioned as to be inwardly compressed to provide fluid tightness in addition to the cushioning effect derived from its own resilience, said elastic cushioning member comprising an elastic cushioning strip made of resilient material and an elastic adhesive strip, said adhesive strip being applied to the abutment flange prior to a glass plate being mounted in the frame member; and
    a rim projection provided on the frame member for avoiding any possible displacement of the panel retaining member relative to the frame member by the action of a reactive force exerted by the compressed elastic cushioning member, a circumferential surface of said panel retaining member being slightly greater than that of the rim projection.

2. A window stay as claimed in claim 1, wherein said panel retaining member comprises a plurality of segments formed by splitting it in the corresponding number.

3. A window stay as claimed in claim 2, wherein said segments of the panel retaining member have their opposite ends inclined such that, when the segments are secured to the window frame, they can form the complete panel retaining member.

4. A window stay as claimed in claim 1, wherein said panel retaining member is of one-piece construction.

* * * * *